United States Patent [19]

Nissen

[11] Patent Number: 5,271,280
[45] Date of Patent: Dec. 21, 1993

[54] APPARATUS FOR MEASURING THE FLOWRATE OF A FLUID

[76] Inventor: Peter Nissen, Birkenweg 1, 3405 Rosdorf, Fed. Rep. of Germany

[21] Appl. No.: 979,832

[22] Filed: Nov. 23, 1992

[30] Foreign Application Priority Data

Nov. 22, 1991 [EP] European Pat. Off. ......... 91119971.9

[51] Int. Cl.$^5$ ............................................. G01F 1/60
[52] U.S. Cl. ................................. 73/861.16; 73/861.12
[58] Field of Search ............... 73/861.12, 861.15, 861.16

[56] References Cited

U.S. PATENT DOCUMENTS

| 4,658,653 | 4/1987 | Tomita | 73/861.12 |
| 4,773,274 | 9/1988 | Kobayashi et al. | 73/861.16 |
| 5,090,250 | 2/1992 | Wada | 73/861.12 |

FOREIGN PATENT DOCUMENTS

| 0416866 | 3/1991 | European Pat. Off. | 73/861.12 |
| 0451308 | 10/1991 | European Pat. Off. | |
| 2743954 | 4/1979 | Fed. Rep. of Germany | |
| 2201785 | 9/1988 | United Kingdom | |

OTHER PUBLICATIONS

H. Ostling, "Dual Frequency Excitation Sets New Magmeter Performance Standard," *Control Engineering*, vol. 10, at pp. 20-21 (Sep., 1990).

*Primary Examiner*—Herbert Goldstein
*Assistant Examiner*—Elizabeth L. Dougherty
*Attorney, Agent, or Firm*—Ratner & Prestia

[57] ABSTRACT

A device to measure the flowrate of electrically charged fluids consisting of a pipe section through which the fluid flows which contains at least two current sources connected to electromagnets, which generate a magnetic field which extends through the pipe section, and which contains for the measurement of the electrical potential due to the charge differential at least two electrodes, whose axes are connected by an imaginary line which extends through the fluid flow, and which electrodes are connected to a correction circuit which produces an output signal proportional to the flowrate which is only minimally influenced by the flow profile and/or the level of the fluid in the pipe section characterized by electromagnets which are excited from the current sources by different frequencies and that between the electrodes and the correction circuit are connected parallel to each other band pass filters corresponding to the different frequencies, and connected after these band pass filters are dc rectifiers controlled by the different frequencies.

13 Claims, 3 Drawing Sheets

APPARATUS FOR MEASURING THE FLOWRATE OF A FLUID

BACKGROUND OF THE INVENTION

The present invention relates to a circuit for a device to measure the flowrate of electrically charged fluids and includes (1) a pipe section through which the fluid flows, (2) electromagnets, (3) at least two current sources connected to the electromagnets which cause the electromagnets to generate a magnetic field which extends through the pipe section, (4) at least two electrodes whose axes are connected by an imaginary line which extends through the fluid flow for the measurement of the electrical potential due to charge differential in the fluid flow, and (5) a correction circuit to which signals generated by the electrodes are connected and which produces an output signal proportional to the flowrate which is only minimally influenced by the flow profile and/or the level of the fluid in the pipe section.

A known circuit, described in DE-OS 27 43 954, has two electromagnets which, in relation to each other, can be turned on or off or reversed to change the magnetic field and thereby develop a correction function from the signals coming from the electrodes. The arrangement produces an output signal corresponding to the flowrate of the fluid in the pipe section which is essentially independent of the flow profile.

Another known circuit, described in EP-0451 308 A1, contains two pairs of electrodes with which flowrate measurements are made even if the pipe section is not full. Two electromagnets are provided which, relative to each other, can be turned on or off or reversed. By means of a correction function, an output signal is developed which is essentially independent of the flow profile in the flow stream and/or the level of the fluid in the pipe section.

Both circuits require, in addition to a normal magnet excitation, at least one other dissimilar magnet excitation in order to correct the output signal by means of a correction circuit. Because of the requirement for different magnet excitations, the response time, relative to that for single magnet excitation, is increased.

SUMMARY OF THE INVENTION

An object of the present invention is to provide a circuit for a device to measure the flowrate of electrically charged fluids whose response time is shortened.

This object is achieved, according to the present invention, by a circuit characterized by (1) electromagnets excited from different current sources with different frequencies, (2) band pass filters connected in parallel to each other and corresponding to the different frequencies between the electrodes and the correction circuit, and (3) rectifiers controlled by the different frequencies between the band pass filters and the correction circuit.

The response time of the circuit, constructed in accordance with this invention, is shortened as desired because the signal developed at the electrodes is proportional to the sum of the signals due to the different excitations of the magnetic field. The different frequency components of the electrode signal are separated by the band pass filters and used to correct the output signal developed from a distorted flow profile or a partially full pipe section.

If a very short response time is required, then higher frequency magnet excitations are utilized. This is contrary to the desire to utilize lower excitation frequencies for more stable output signals at zero flow. In order to achieve a compromise between these opposing requirements, it is preferred to excite each electromagnet with at least two different frequencies.

Alternating current sources can be used to excite the electromagnets as well as pulsed current sources whose frequencies can be selected as desired.

For quickly changing processes, which are mostly due to disturbances, the higher excitation frequencies are preferred. For steady flow conditions, the lower excitation frequencies are preferred. To achieve this, the preferred circuitry is characterized by logic building elements connected between the rectifiers and the correction circuit, by which the signals of only the fast changing processes in the flow stream, detected by the rectifiers and corresponding to the higher frequencies, are connected to the correction circuit and only the signals of the slow changing processes in the flow stream, detected by the rectifiers and corresponding to the lower frequencies, are connected to the correction circuit.

The invention will be described with reference to the figures.

DETAILED DESCRIPTION OF THE INVENTION

Figure 1:
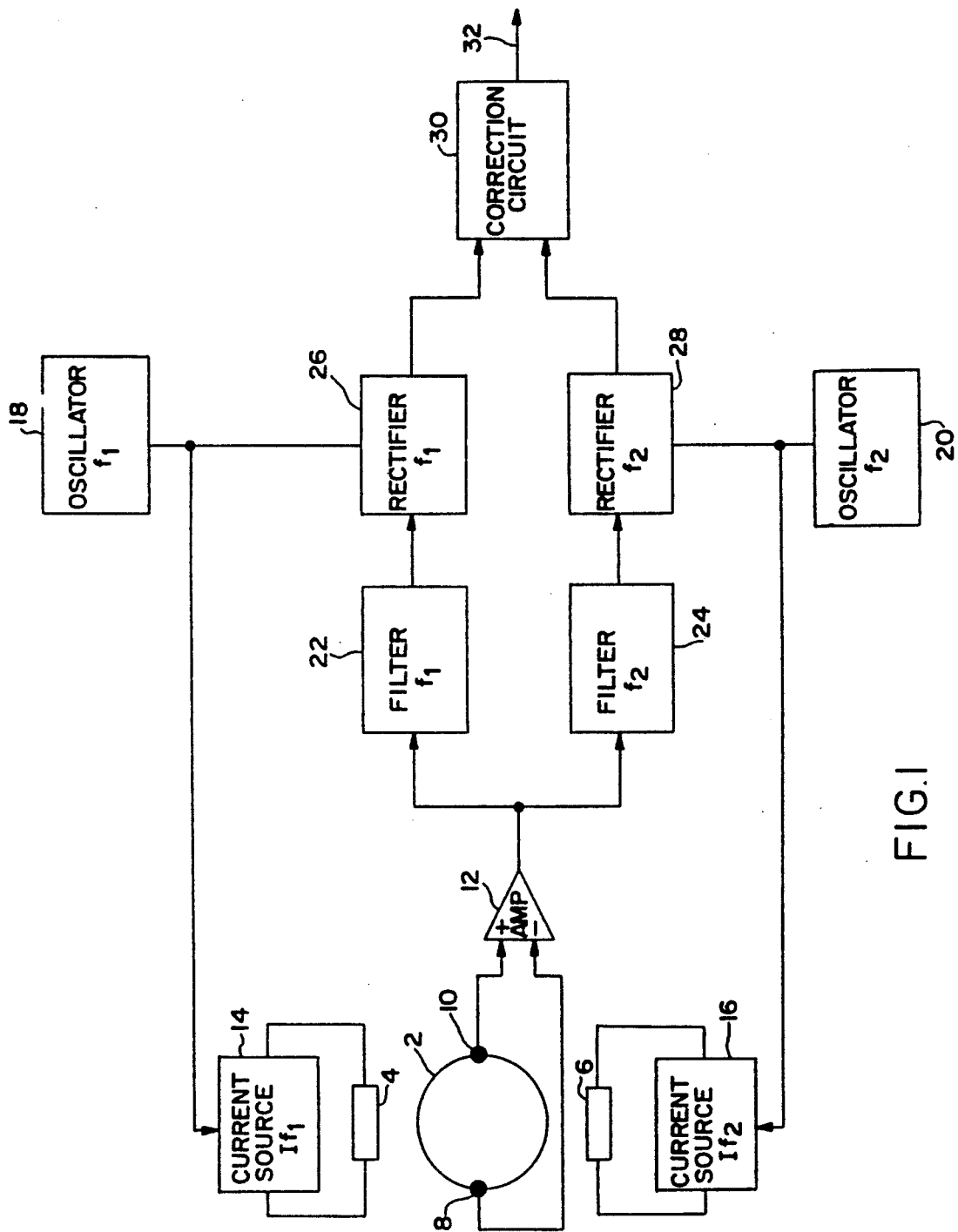
FIG. 1 shows a block diagram of a circuit arrangement in which the two electromagnets are excited with different frequencies.
Figure 2:
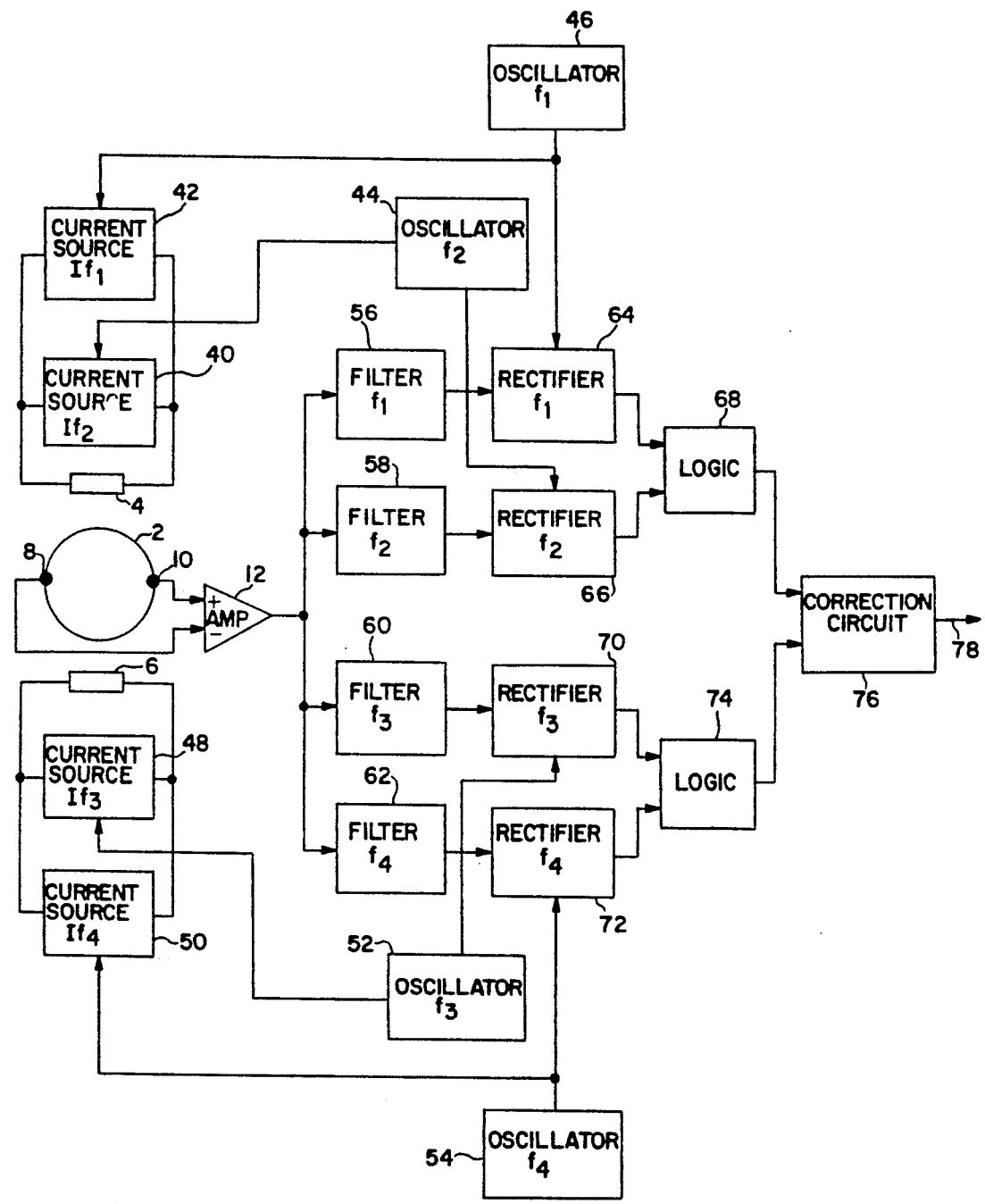
FIG. 2 shows a block diagram of a circuit arrangement in which each electromagnet is excited with two different frequencies.

The circuits of FIGS. 1 and 2 serve to measure the flowrate of a fluid containing charges which flows through the pipe section 2. Each of these circuits has two electromagnets 4, 6 and two electrodes 8, 10 which are connected to the inputs of an amplifier 12.

In the circuit arrangement in FIG. 1, each electromagnet 4, 6 is connected to a current driver circuit 14, 16, respectively, so as to be excited by alternating currents having frequencies $If_1$ and $If_2$, with $f_1$ and $f_2$ being different. The current driver circuits 14, 16 are controlled by the frequency oscillators 18, 20 having frequencies $f_1$ and $f_2$, respectively. The output of the amplifier 12 is connected to the inputs of the band pass filters 22 ($f_1$) and 24 ($f_2$). The outputs of the band pass filters 22, 24 are connected through rectifiers 26, 28 to the inputs of the correction circuit 30, which provides the corrected output signal on lead 32 which is proportional to the flowrate of the fluid in the pipe section 2. The rectifiers 26, 28 are synchronized rectifiers and are controlled by the oscillators 18, 20, respectively.

Because electrodes 8, 10 develop signals proportional to the magnetic field strength and proportional to the flowrate of the fluid flowing through the pipe section, the signals developed by the electrodes, for the circuit arrangement shown in FIG. 1, include components of two different frequencies. Filters 22 and 24 separate the two frequency components and the rectifiers 26 and 28 detect the modulations of the two frequency components which change with time according to the flowrate of the fluid flowing through the pipe section.

Thus, partial voltages are generated by separate magnetic field components developed by the two electromagnets. A balance of the partial voltages signals a uniform flow profile of the fluid flowing through the pipe section and a full pipe section. An imbalance of the partial voltages indicates a non-uniform flow profile or a partially full pipe section. In this case, the output signal at lead 32 is not just the sum of the partial voltages developed by rectifiers 26 and 28, but is a corrected sum which is a function of the imbalance of the partial voltages. The correction function is determined empirically (i.e. by comparing the true flowrate against the output signal in a flow test rig).

In the circuit arrangement shown in FIG. 2, the electromagnet 4 is connected to two parallel current driver circuits 40, 42, with the current driver circuit 40 controlled by the frequency $f_2$ from oscillator 44 and the current driver circuit 42 controlled by the frequency $f_1$ from oscillator 46. Therefore, alternating currents $If_1$ and $If_2$ flow through electromagnet 4, with $f_1$ and $f_2$ being different. Electromagnet 6 is connected to two parallel current driver circuits 48, 50, with the current driver circuit 48 controlled by the frequency $f_3$ from oscillator 52 and the current driver circuit 50 controlled by the frequency $f_4$ from oscillator 54. Therefore, alternating currents $If_3$ and $If_4$ flow through electromagnet 6, with $f_1$, $f_2$, $f_3$ and $f_4$ all being different and $f_1 < f_2$ and $f_3 < f_4$.

The output of the amplifier 12 is connected to the inputs of the four band pass filters 56, 58, 60, 62 having passbands corresponding to the four frequencies $f_1$, $f_2$, $f_3$, $f_4$. The outputs of the band pass filters 56, 58 are connected through rectifiers 64, 66, respectively, to the inputs of a logic circuit 68. The outputs of the band pass filters 60, 62 are connected through rectifiers 70, 72, respectively, to the inputs of a logic circuit 74. The rectifiers 64, 66, 70, 72 are synchronized rectifiers controlled by the oscillators 44, 46, 52, 54, respectively.

The outputs of the logic circuits 68, 74 are connected to a correction circuit 76 which, in a manner generally similar to the FIG. 1 circuit described above, provides the corrected output signal on lead 78. Specifically, the different frequency components of the electrode signal are separated by the band pass filters. If a very short response time is required, then higher frequency magnet excitations are utilized. For quickly changing processes, which are mostly due to disturbances, the higher excitation frequencies are preferred. For steady flow conditions, the lower excitation frequencies are preferred. The logic circuits connected between the rectifiers and the correction circuit are arranged such that the signals of only the fast changing processes in the flow stream, detected by the rectifiers and corresponding to the higher frequencies, are connected to the correction circuit and only the signals of the slow changing processes in the flow stream, detected by the rectifiers and corresponding to the lower frequencies, are connected to the correction circuit. Logic 68, for example, contains a switch-over mechanism by which transient flowrate changes derived by rectifier 66 are used in developing the output signal. For the steady flow conditions, the effect of rectifier 64 dominates the development of the output signal. Such an arrangement is described in an article entitled *Dual-Frequency Excitation Sets New Magmeter Performance Standard* by Hoag Ostling appearing at pages 20 and 21 in *Control Engineering, September* 1990.

Figure 3:
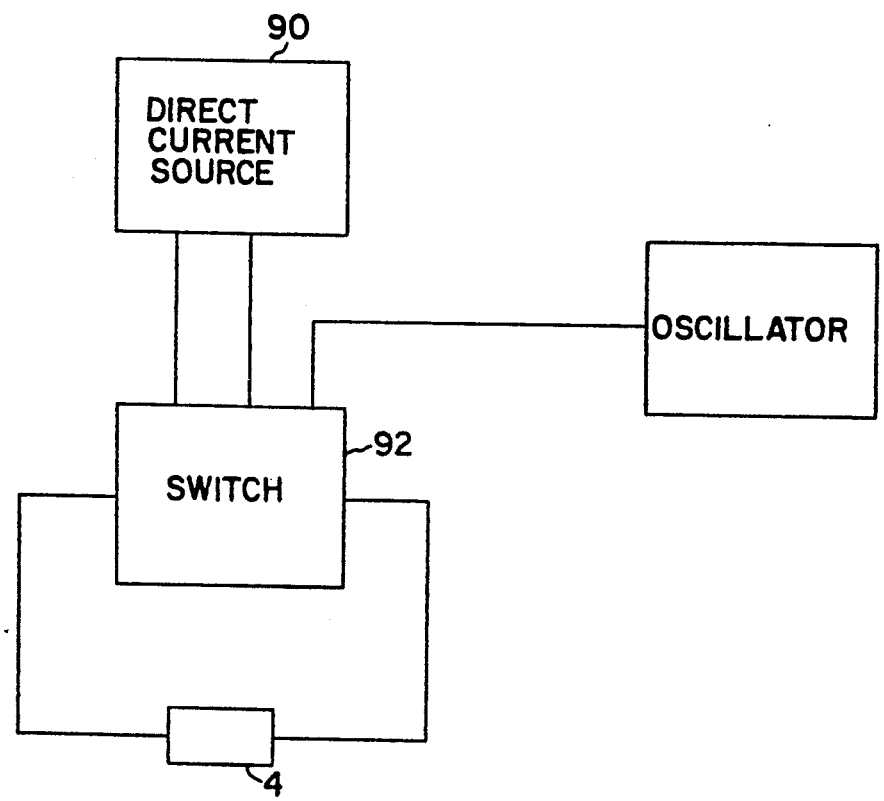
FIG. 3 shows a block diagram of a modification to a portion of the circuit arrangements of FIGS. 1 and 2.

As shown in FIG. 3, the current sources of FIGS. 1 and 2 can be composed of a direct current source 90 and a reverse/off switch 92 which is controlled by one of the oscillators, such as oscillator 18 of FIG. 1.

What is claimed is:

1. Apparatus for measuring the flowrate of a fluid containing electrical charges, said apparatus comprising:

a pipe section through which said fluid containing electrical charges flows:

electromagnets for generating a magnetic field extending through said pipe section;

a plurality of current supply means having different frequencies for supplying excitation currents to said electromagnets;

means, including at least two electrodes disposed along a line passing through said pipe section in the region of said magnetic field, for generating signals which include a plurality of components having frequencies corresponding to said frequencies of said current supply means and modulations representative of displacements of electrical charges in said fluid;

a plurality of band pass filters connected in parallel to each other and having passbands corresponding to said frequencies of said current supply means for selectively passing said components of said signals generated by said signal generating means according to said frequencies of said components;

a plurality of rectifiers individually responsive to said components of said signals generated by said signal generating means and passed by said band pass filters for detecting said modulations of said components of said signals;

and a correction circuit responsive to said modulations detected by said rectifiers for producing an output signal proportional to the flowrate, whereby said output signal is only minimally influenced by the flow profile and/or the level of the fluid in the pipe section.

2. Apparatus according to claim 1 wherein said current supply means include alternating current sources.

3. Apparatus according to claim 1 wherein said current supply means include direct current sources and reverse/off switches.

4. Apparatus according to claim 1 wherein each of said electromagnets is excited by a single frequency.

5. Apparatus according to claim 1 wherein each of said electromagnets is excited by two different frequencies.

6. Apparatus according to claim 5 further including logic circuits connected between said rectifiers and said correction circuit for selectively connecting to said correction circuit only said modulations of the higher frequency components corresponding to fast changing processes and only said modulations of the lower frequencies corresponding to slow changing processes.

7. Apparatus for measuring the flowrate of a fluid containing electrical charges, said apparatus comprising:

a pipe section through which said fluid containing electrical charges flows;

first and second electromagnets for generating a magnetic field extending through said pipe section;

first and second current supply means having different frequencies for supplying excitation currents to said first and said second electromagnets, respectively;

means, including two electrodes disposed along a line passing through said pipe section in the region of said magnetic field, for generating signals which include first and second components having frequencies corresponding to said frequencies of said current supply means and modulations representative of displacements of electrical charges in said fluid;

first and second band pass filters connected in parallel to each other and having a passbands corresponding to said frequencies of said first and said second current supply means, respectively, for selectively passing said first and said second components, respectively, of said signals generated by said signal generating means;

first and second rectifiers individually responsive to said first and said second components, respectively, of said signals generated by said signal generating means and passed by said band pass filters for detecting said modulations of said first and said second components, respectively, of said signals;

and a correction circuit responsive to said modulations detected by said rectifiers for producing an output signal proportional to the flowrate, whereby said output signal is only minimally influenced by the flow profile and/or the level of the fluid in the pipe section.

8. Apparatus for measuring the flowrate of a fluid containing electrical charges, said apparatus comprising:

a pipe section through which said fluid containing electrical charges flows:

first and second electromagnets for generating a magnetic field extending through said pipe section;

first, second, third and fourth current supply means having different frequencies for supplying excitation currents from said first and said second current supply means to said first electromagnet and excitation currents from said third and said fourth current supply means to second electromagnet;

means, including two electrodes disposed along a line passing through said pipe section in the region of said magnetic field, for generating signals which include first, second, third and fourth components having frequencies corresponding to said frequencies of said first, said second, said third and said fourth current supply means and modulations representative of displacements of electrical charges in said fluid;

first, second, third and fourth band pass filters connected in parallel to each other and having passbands corresponding to said frequencies of said first, said second, said third and said fourth current supply means, respectively, for selectively passing said first, said second, said third and said fourth components, respectively, of said signals generated by said signal generating means;

first, second, third and fourth rectifiers individually responsive to said first, said second, said third and said fourth components, respectively, of said signals generated by said signal generating means and passed by said band pass filters for detecting said modulations of said first, said second, said third and said fourth components, respectively, of said signals;

a first logic circuit for selecting only said modulations of the higher frequency component of said first and said second components of said signals generated by said signal generating means and corresponding to fast changing processes and only said modulations of the lower frequency component of said first and said second components of said signals generated by said signal generating means and corresponding to slow changing processes;

a second logic circuit for selecting only said modulations of the higher frequency component of said third and said fourth components of said signals generated by said signal generating means and corresponding to fast changing processes and only said modulations of the lower frequency component of said third and said fourth components of said signals generated by said signal generating means and corresponding to slow changing processes;

and a correction circuit responsive to said modulations selected by said logic block for producing an output signal proportional to the flowrate, whereby said output signal is only minimally influenced by the flow profile and/or the level of the fluid in the pipe section.

9. A device to measure the flowrate of electrically charged fluids consisting of a pipe section through which the fluids flows which contains at least two current sources connected to electromagnets, which generate a magnetic field which extends through the pipe section, and which contains for the measurement of the electrical potential due to the charge differential at least two electrodes, whose axes are connected by an imaginary line which extends through the fluid flow, and which electrodes are connected to a correction circuit which produces an output signal proportional to the flowrate which is only minimally influenced by the flow profile and/or the level of the fluid in the pipe section wherein electromagnets are excited by their current sources by different frequencies and between the electrodes and the correction circuit are connected parallel to each other band pass filters corresponding to the different frequencies, and connected after these band pass filters are rectifiers controlled by the different frequencies.

10. A device in accordance with claim 9 wherein the current sources are alternating current sources.

11. A device in accordance with claim 9 wherein the current sources are pulse current sources.

12. A device in accordance with claim 11 wherein each electromagnet is excited by at least two different frequencies.

13. A device in accordance with claim 12 wherein logic circuits are connected between the rectifiers and the correction circuit by which only the fast changing processes in the flow stream are connected by the rectifiers corresponding to the higher frequencies to the correction circuit and only the slow changing processes in the flow stream are connected by the rectifiers corresponding to the lower frequencies to the correction circuit.

* * * * *